(12) United States Patent
Yao et al.

(10) Patent No.: US 8,828,312 B2
(45) Date of Patent: Sep. 9, 2014

(54) DILUTION CONTROL IN HARDFACING SEVERE SERVICE COMPONENTS

(75) Inventors: Matthew Yao, Belleville (CA); Rachel Collier, Belleville (CA); Danie DeWet, Kingston (CA)

(73) Assignee: Kennametal Inc., Latrobe, PA (US)

(*) Notice: Subject to any disclaimer, the term of this patent is extended or adjusted under 35 U.S.C. 154(b) by 96 days.

(21) Appl. No.: 13/315,009

(22) Filed: Dec. 8, 2011

(65) Prior Publication Data

US 2013/0149552 A1    Jun. 13, 2013

(51) Int. Cl.
   *B22F 7/00*     (2006.01)
   *B32B 15/01*    (2006.01)
   *F16K 25/00*    (2006.01)
   *C23C 28/02*    (2006.01)

(52) U.S. Cl.
   CPC ........................... *B32B 15/01* (2013.01)
   USPC ...... 419/9; 419/26; 419/36; 419/40; 428/678; 427/398.1; 427/580; 427/191; 251/366

(58) Field of Classification Search
   CPC .............................. C23C 28/021; B32B 15/01
   USPC ........................................................... 419/26
   See application file for complete search history.

(56) References Cited

U.S. PATENT DOCUMENTS

| | | | |
|---|---|---|---|
| 4,521,664 A | 6/1985 | Miller | |
| 4,686,348 A | 8/1987 | Johns et al. | |
| 5,002,839 A | 3/1991 | Qureshi et al. | |
| 5,879,743 A * | 3/1999 | Revankar | 427/191 |
| 6,385,847 B1 | 5/2002 | Larson et al. | |
| 6,589,600 B1 | 7/2003 | Hasz et al. | |
| 6,827,254 B2 | 12/2004 | Hasz et al. | |
| 6,846,575 B2 | 1/2005 | Hasz et al. | |
| 6,858,813 B1 | 2/2005 | Keller et al. | |
| 6,861,612 B2 | 3/2005 | Bolton et al. | |
| 7,222,422 B2 | 5/2007 | Gupta et al. | |
| 2006/0134455 A1* | 6/2006 | Belhadjhamida et al. | 428/668 |
| 2006/0181151 A1* | 8/2006 | Wodrich et al. | 305/201 |
| 2009/0019783 A1 | 1/2009 | Amano et al. | |
| 2010/0189910 A1 | 7/2010 | Belashchenko | |
| 2010/0276209 A1* | 11/2010 | Yong et al. | 175/374 |
| 2011/0042145 A1* | 2/2011 | Xia et al. | 175/374 |
| 2011/0067796 A1 | 3/2011 | Belhadjhamida et al. | |
| 2011/0070119 A1 | 3/2011 | Belhadjhamida et al. | |
| 2011/0171484 A1* | 7/2011 | Konyashin et al. | 428/556 |

OTHER PUBLICATIONS

Raghu et al., "PTA Proves Its Worth in High-Volume Hardfacing Jobs" Welding Journal, Feb. 1996, pp. 34-40.

* cited by examiner

*Primary Examiner* — Jessee Roe
*Assistant Examiner* — Christopher Kessler
(74) *Attorney, Agent, or Firm* — Matthew W. Smith, Esq.

(57) ABSTRACT

Forming a wear- and corrosion-resistant coating on an industrial component such as a chemical processing or nuclear power valve component by applying a cobalt-based dilution buffer layer to an iron-based substrate by slurry coating, and then applying by welding a cobalt-based build-up layer over the cobalt-based dilution buffer layer. An industrial component having a dilution buffer layer and a welding build-up layer thereover.

25 Claims, 10 Drawing Sheets

DILUTION CONTROL IN HARDFACING SEVERE SERVICE COMPONENTS

FIELD OF THE INVENTION

This invention relates to imparting wear-resistant and corrosion-resistant coatings to industrial components especially valves and valve components subject to severe service conditions, such as in the nuclear power, petrochemical, and chemical industries.

BACKGROUND OF THE INVENTION

Hardfacing is one of the surfacing methods most widely employed in nuclear valve manufacturing industries to deposit, for example, cobalt-based Stellite brand alloys to enhance specific properties such as wear and corrosion resistance of valve components such as discs, wedges, seats and seat rings. The most common hardfacing techniques employed are oxyacetylene gas welding (OAW), gas tungsten arc welding (GTAW) or tungsten inert gas welding (TIG), gas metal arc welding (GMAW) or metal inert gas welding (MIG), submerged arc welding (SAW), and plasma transferred arc welding (PTA). Among them, the most important differences lie in the welding efficiency and the weld dilution rates. The different hardfacing processes can generate weld deposit thickness between 0.080 inch (2 mm) and 0.800 inch (20 mm). The deposition rate can vary from 0.5 to 20 kg/h. The fusion zone and heat affected zone can be between 0.020 inch (0.5 mm) and 0.400 inch (10 mm).

Dilution is an important parameter in the deposition of weld overlays as it defines the degree to which the substrate material has mixed with the overlay material. This mixing directly affects the composition of the resulting surface layer, along with its microstructure, wear and corrosion performance. As Fe from a steel substrate mixes into an overlay, the Fe dilutes the composition of the overlay, and thereby negatively affects its properties. For example, FIG. 1 shows that the hot hardness of cobalt alloy weld overlays drops off sharply as Fe content increases up to 10 wt %. Each line represents hardness measured at different temperatures 204° C., 427° C., 538° C., 649° C., and 760° C. At higher temperatures this effect is much more pronounced. It is therefore desirable to control the Fe dilution less than 5 wt % to maintain the hot hardness and therefore the wear resistance of cobalt alloy overlays. FIG. 2 shows that adhesion wear resistance and abrasion wear resistance are negatively affected by Fe dilution. The right vertical axis shows the units for adhesion wear resistance in cubic millimeters volume loss and the left vertical axis shows the abrasion wear resistance in cubic millimeters volume loss.

Dilution can be measured by chemical analysis of the Fe profiles, which represents actual dilution in the hardfacing layer. Dilution levels vary widely and depend on a large number of factors, however typical dilution levels of various hardfacing technologies can be stated as follows for illustration: OAW—1%-10%, TIG—15%-20%, MIG—15%-25%, SAW—10%-60%, PTA—5%-30%. The higher heat input required to build up a thick single layer deposit tends to result in more dilution in the deposited layer and distortion of the base structure. Maintaining dilution down in the range between 10% and 15% is generally considered optimum in terms of bond integrity and hardfacing layer integrity. Unfortunately, most welding processes have considerably greater dilution.

For valves in critical applications such as severe service conditions in nuclear, petrochemical, chemical processing, and mining applications, the plasma transferred arc welding (PTA) process is usually used and multiple hardfacing layers are generally applied in order to control the dilution to be below 5%. A first layer typically has high dilution, but being a cobalt-based alloy with Fe diluted therein, it has less Fe than the substrate. Then a second layer, being a cobalt-based layer on a cobalt-based layer diluted with Fe, will have less Fe than the first layer. Then a third layer on top of the second layer will have even less Fe than the second layer. So the Fe content of the outermost layer is lower than the Fe content of the underlying layers and the substrate. So by applying multiple layers, an outermost layer has been provided with reduced Fe content. Theoretically, if the dilution in the first layer is about 30%, the dilution in the second layer may be reduced to about 9%, and to about 2.7% in the third layer. While effective to achieving satisfactorily low Fe levels in the outermost layer encountering the wear and corrosion service conditions, applying multiple layers and thick deposits have a high cost in terms of hardfacing materials and labor. Multiple layers and thick deposits also introduce fusion defects and have a tendency to yield deposits containing cracks.

Some nuclear valves are made from low carbon stainless steels or corrosion resistant nickel alloys. Preferential attack in the fusion zone may occur which may be attributed to a higher than normal level of carbon, resulting from carbon diffusion, during the hardfacing process. The corrosion resistance of the fusion zone therefore may be compromised by excessive dilution of Fe and C near the fusion line.

U.S. Pat. No. 4,521,664 to Miller discloses a process and apparatus for surfacing with high deposition and dilution levels less than 30%. However, high deposit rates are generally accomplished by the use of high heat input which invariably leads to high dilution. It is difficult to achieve high deposit rates and to maintain low dilution simultaneously.

U.S. Pat. No. 4,686,348 to Johns et al. discloses a method for hardfacing valves to reduce the dilution by valve head material. The method involves machining a groove/recess with a special cross-sectional size and/or shape.

U.S. Pat. No. 5,002,839 to Qureshi et al. discloses the use of a buffering layer of austenitic stainless under a cobalt-based layer in processes for manufacturing and repairing valve seats.

U.S. Pat. No. 6,858,813 to Keller et al. discloses an alternating current MIG process which can produce weld overlay with a thickness range from 0.030 inches to 0.100 inches thick, with dilution rates of less than 20%.

U.S. Pat. No. 6,861,612 to Bolton discloses methods for using a laser beam to apply wear-reducing material to tool joints and with reduced dilution of the base metal into the applied wear-reducing material. However, S. Sun et al. found that high dilution can result from laser cladding of cobalt-based alloys. Correlation between Melt Pool Temperature and Clad Formation in Pulsed and Continuous Wave Nd:YAG Laser Cladding of Stellite 6, Proceedings of the 1st Pacific International Conference on Application of Lasers and Optics 2004. Therefore, the melt pool temperature and laser power must be strictly controlled to control the dilution which imposes practical difficulties.

D. Raghu et al. disclose in *PTA Proves Its Worth in High-Volume Hardfacing Jobs*, Welding Journal, February 1996, pp 34-40, that for PTA welding, dilution can be controlled to about 5 to 7% in most cases when the heat input is precisely controlled. In contrast, other forms of welding deposits can have up to 50% dilution and inconsistent wear resisting properties of the overlay through the weld deposit.

U.S. Pat. No. 6,385,847 to Larson et al. points out that the PTA offers several advantages such as controllable heat source and lower energy consumption which can provide finer microstructure and narrower heat affected zones; versatility for powders and different raw materials; higher volume production capability; and minimum raw material waste. However, the current PTA processes usually operate at such a high temperature that in some valve applications the torch burns through the valve from the seat facing groove to the valve combustion face on the valve head. One solution might be to add additional stock material to the combustion face to act as a heat sink. However, that option adds to the cost of manufacturing due to the extra machining required to remove the material afterwards as well as the cost of the material itself, as a waste material.

The prior art methods therefore provide inconsistent results in terms of dilution reduction. And using current prior art processes, it is necessary to closely control parameters, and even then it is difficult to achieve a hardfacing deposit with less than 5% dilution.

SUMMARY OF THE INVENTION

Briefly, therefore, in one aspect the invention is directed to a method for forming a wear- and corrosion-resistant coating on an industrial component, the method comprising a) applying a cobalt-based dilution buffer layer having a thickness between about 0.005 and about 0.03 inch to an iron-based substrate by slurry coating of a cobalt-based alloy powder followed by sintering to fuse the powder together and to the substrate; b) applying by welding a cobalt-based build-up layer over the cobalt-based dilution buffer layer to integrate the build-up layer and the dilution buffer layer into an integral cobalt-based wear- and corrosion-resistant layer; and c) cooling the component to room temperature.

The invention is also directed to method for forming a wear- and corrosion-resistant coating on an industrial valve component, the method comprising a) applying a cobalt-based dilution buffer layer having a thickness between about 0.005 and about 0.03 inch to an iron-based valve component body substrate selected from the group consisting of a valve body, a ball and seat of a ball-and-ring valve assembly, a gate valve component body, a V-ball valve component body, a wedge valve component body and guides, and a valve seat body, said applying comprising slurry coating of a cobalt-based alloy powder followed by sintering to fuse the powder together and to the substrate; b) applying by welding a cobalt-based build-up layer over the cobalt-based dilution buffer layer to integrate the build-up layer and the dilution buffer layer into an integral cobalt-based wear- and corrosion-resistant layer; and c) cooling the component to room temperature.

In another aspect the invention is directed to an industrial component comprising an iron-based substrate body; and a cobalt-based layer over a surface of the substrate and securely bonded directly to the substrate body with no metal layer between the cobalt-based layer and the substrate body. The cobalt-based layer has a thickness of at least about 0.055 inch; and the cobalt-based layer has an average level of iron dilution from the iron-based substrate into the cobalt-based layer of less than 5 wt % iron at a level spaced 0.06 inch from the substrate surface.

Other objects and features will be in part apparent and in part pointed out hereinafter.

DETAILED DESCRIPTION OF PREFERRED EMBODIMENTS

Figure 1:
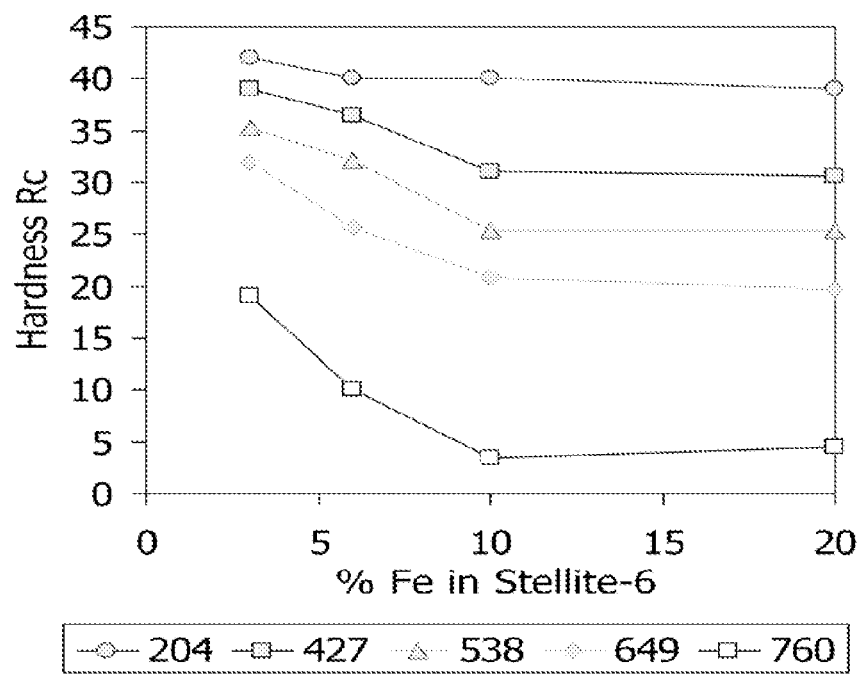
FIG. 1 is a graph showing the effect of Fe dilution on hardness in a cobalt-based alloy.
Figure 2:
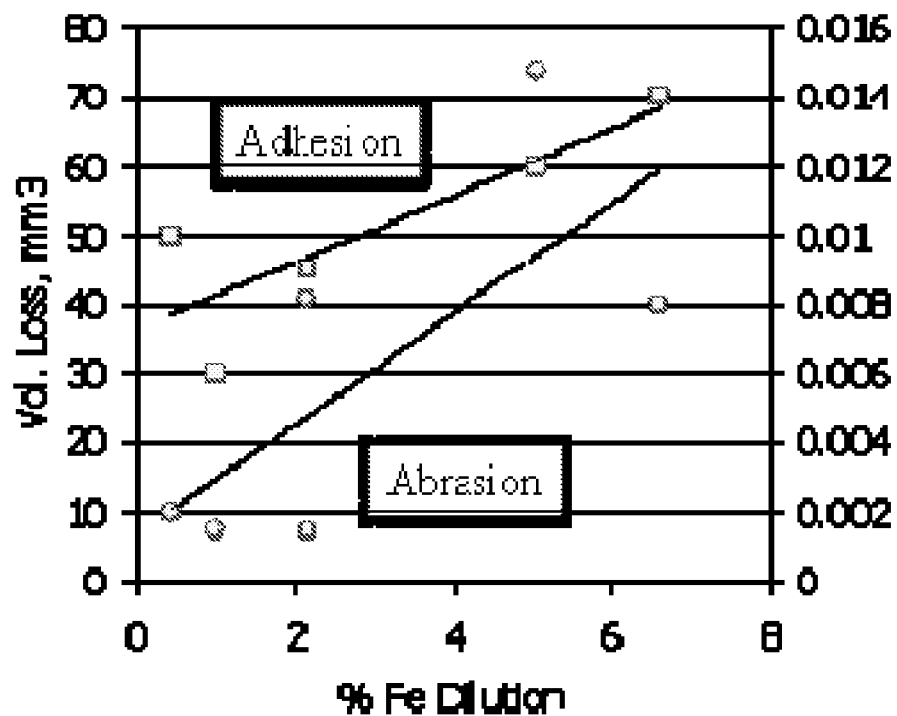
FIG. 2 is a graph showing the effect of Fe dilution on adhesive and abrasive wear resistance.

In accordance with one aspect of this invention, a wear and corrosion-resistant coating is applied to an industrial component. The invention is particularly suitable for valve components for use in nuclear and fossil fuel power plants, in petrochemical plants, and in chemical processing plants. Examples of such components include but are not limited to discs, wedges, seats, and seat rings of nuclear, petrochemical, or chemical valves.

In the method, a cobalt-based wear- and corrosion-resistant layer is formed on the surface of the component substrate. This layer is formed in two steps involving forming a first layer and then depositing a second layer over the first layer in a manner such that the first layer and second layer first layer form an integral layer. The first step is to apply a cobalt-based first layer or cobalt-based dilution buffer layer to an iron-based substrate by slurry coating of a cobalt-based alloy powder followed by sintering to fuse the powder together and to the substrate. The second step is to apply a second layer or build up layer over the cobalt-based dilution buffer layer. The second layer is applied by a welding process such as by plasma transferred arc welding. As part of this process, the build-up layer and the dilution buffer layer are integrated into an integral cobalt-based wear- and corrosion-resistant layer. The component is cooled to room temperature, for example passively by simply allowing the component to cool in ambient, or slow cooling in vermiculite, or in a controlled cooling cycle in an oven. The first layer functions as a dilution buffer layer as described hereinbelow to inhibit dilution of iron from the iron-based substrate into the cobalt-based wear- and corrosion-resistant layer.

The invention also encompasses an industrial component for wear and corrosion applications. The component has a cobalt-based wear- and corrosion-resistant layer. The cobalt-based layer is over a surface of the iron-based substrate and securely bonded directly to the substrate body with preferably no metal layer between the cobalt-based layer and the substrate body. The cobalt-based layer has a thickness of at least about 0.055 inch. The cobalt-based layer has a reduced level of iron dilution from the iron-based substrate into the cobalt-based layer. The final cobalt-based wear- and corrosion-resistant layer is a fully integral layer formed by the process herein involving deposition of a first layer followed by deposition of a second layer and integrating the layers to form the fully integral layer. In one sense, therefore, the final integral layer comprises a first band having a thickness between about 0.005 and about 0.03 inches thick. This first band of the coating is an inner band directly on the iron-based substrate surface. This band of the coating is formed by slurry coating and sintering. The layer also includes a second band which is a welding deposit having a thickness between about 0.05 and about 0.8 inch, such as between about 0.08 and about 0.5 inch. These are distinct bands in the conceptual sense that each is a thickness deposited sequentially by distinct processes. But they are not readily recognizable as distinct bands in the final finished product because the respective layers are fully integrated by the welding process.

Cobalt-based alloys such as Stellite 6 have thermal properties which are markedly distinct from thermal properties of mild steel substrates:

| Property | Stellite 6 | Mild Steel |
|---|---|---|
| Liquidus temperature, ° C. | 1354 | 1530 |
| Eutectic temperature, ° C. | 1265 | 1493 |
| Thermal conductivity from 1000° C. to liquid, W/m/° C. | 41-49 | 34-35 |
| Volumetric specific heat from 1000° C. to liquid, J/m$^3$/° C. | $(6.28\text{-}9.03) \times 10^6$ | $(8.07\text{-}12.8) \times 10^6$ |
| Latent heat effusion, J/g | 310 | 272 |

When applying a welding layer directly onto Stellite 6 or onto mild steel, therefore, there are significant differences in the effects of high welding heat input to Stellite 6 or to mild steel. The lower melting point and high thermal conductivity of cobalt-based alloys such as Stellite 6 means that they more readily melt and bond to a surface overlayer being applied by a welding technique, so less heat input is required. In contrast, mild steel has a higher melting point, which requires much higher heat input to bond to a surface overlayer being applied by a welding technique. The term "mild steel" as used herein refers to steel having a carbon content of up to about 0.25 wt %. All percentages in this application are by weight unless stated otherwise. And the lower thermal conductivity of mild steel means that heat dissipates more slowly, causing a build up of heat, and hotter surface temperatures.

The present invention takes advantage of the foregoing distinctions between mild steel and certain cobalt-based alloys in order to reduce dilution by employing a non-welded, cobalt-based, dilution buffer layer or band as a component of an overall cobalt-based wear- and corrosion-resistant layer. The effectiveness of the dilution buffer layer is enhanced by the fact that Stellite 6 and other cobalt-based alloys have a lower specific heat and higher latent heat of fusion, which provide a thermal heat sink effect to protect from iron in the underneath mild steel diluting into the subsequent cobalt-based, surface overlayer. This surface overlayer, in the overall integrated cobalt-based layer formed by integration of the dilution buffer layer and the surface overlayer, constitutes essentially a surface band within the overall layer. Because it is a band adjacent the upper or outer surface, it is highly advantageous that iron dilution into this band is inhibited by the presence of the dilution buffer. This dilution buffer also helps reduce dilution of carbon from the cobalt-based surface layer into the fusion zone between the substrate and the coating.

The invention therefore involves application of a thin cobalt-based layer by a non-welding deposition method such as fusion coating (slurry+sinter) to an iron-based valve component substrate, followed by application of a cobalt-based surface layer by welding deposition over the fusion coating layer to ensure Fe-dilution less than 5 wt %. This is in contrast to the current commercialized process which involves application of multiple, typically three, successive layers by welding deposition, with each successive layer having a lower level of Fe dilution into the cobalt-based layer. This new method marks a distinct improvement over the multi-welding layer method of the prior art in several distinct respects; for example, dilution is more easily mitigated, less material is used, and other advantages are manifest as discussed in this application.

A primary step in carrying out the invention is forming the cobalt-based, dilution buffer layer on the iron-based substrate. This layer is applied directly to the substrate body with preferably no metal layers between the bulk substrate body and the cobalt-based dilution buffer layer. This dilution buffer layer is, in one aspect, a non-welded layer in that it is deposited by a technique which does not involve any of the welding techniques oxyacetylene gas welding (OAW), gas tungsten arc welding (GTAW), tungsten inert gas welding (TIG), gas metal arc welding (GMAW), metal inert gas welding (MIG), submerged arc welding (SAW), or plasma transferred arc welding (PTA). The dilution buffer is directly on the iron-based substrate with no layers between the iron-based substrate and the cobalt-based, dilution buffer layer. By having this layer be non-welded, this avoids the formation of an electric arc between an electrode and the substrate, and it avoids the formation of an electric arc otherwise adjacent the exposed iron-based surface of the substrate. This is important because by avoiding this arc, high heat input directly into the surface of the iron-based substrate is avoided. This high heat input in prior commercial processes has contributed significantly to the dilution problems. The affirmative requirement of this invention to use a process which is a non-welding process to deposit the initial layer directly onto the iron-based substrate therefore facilitates that layer's function as a buffer against dilution of iron into the eventual surface layer. Moreover, dilution of carbon into the fusion zone is mitigated or avoided.

In a further aspect, the invention employs a fusion coating process as the non-welding process to form the dilution buffer layer. One advantage of a fusion coating process is that it has a lower level of heat input into the substrate than do welding processes. In order to obtain good adherence by welding processes, it is necessary to heat the surface of the substrate to at least the liquidus (melting point) temperature of the substrate so there is mixing and diffusion between the substrate and the material being deposited. In contrast, with the preferred fusion process, the temperature of the substrate during sintering of the slurry coated powder remains below its solidus temperature. Because the substrate is not heated above its solidus temperature, its Fe atoms remain essentially immobile, and they do not tend to vigorously diffuse up into the layer being coated thereon. The sintering is carried out at a temperature above the solidus but below the liquidus temperature of the cobalt-based alloy being sintered. This is important because a liquid-phase sintering is necessary to densify the non-welded cobalt-based alloy dilution buffer layer. The temperature is above the solidus of the cobalt-based layer to ensure liquid-phase sintering, which requires a temperature sufficient to attain substantial liquid-phase in the cobalt-based layer, but not necessarily complete liquid-phase in the cobalt-based layer. For example, a temperature above the solidus but below the liquidus which achieves a minimum of 30% liquid, such as between 30 and 50% liquid of the cobalt phase is preferred in one embodiment. In this respect it is important to achieve a fully sintered coating, without such aggressive sintering as to present distortion issues, i.e., excessive flowing of the coating during sintering.

The composition of the dilution buffer material is selected to, in one preferred embodiment, match or at least approximate the composition of the subsequently applied cobalt-based surface layer, so that the buffer does not introduce detrimental or degrading elements into the subsequent welding overlay. Suitable cobalt-based alloys include, for example, Stellite 6. In one embodiment, the dilution buffer layer comprises between about 25 and about 35 wt % Cr, between about 2 and about 7 wt % W, up to about 1.5 wt % Si, between about 0.5 and 1.5 wt % C, and between about 55 and about 70 wt % Co. Between about 0.05 and 0.5 wt % B may be added to aid in melting during sintering. The metal powder used in forming the slurry is preferably pre-alloyed and is sized through a screen which only passes particles under 45 microns.

The fusion-coated dilution buffer has a thickness of at least about 0.005 inch, such as between about 0.005 and about 0.03 inch, for example between about 0.005 and about 0.02, or between 0.01 and 0.02 inch. The dilution buffer has a fine hypo-eutectic microstructure where the majority of carbide is fine and within the eutectic regions. This microstructure is subsequently altered by the welding process.

A build-up layer of a wear- and corrosion-resistant cobalt-based alloy is then applied directly over the non-welded, dilution buffer layer. This layer is preferably applied by a welding process because such processes are capable of generating a deposit thickness greater than about 0.05 inch which is necessary to protect such components in severe service conditions. In certain preferred embodiments this layer is applied by welding or a welding-based hardfacing process. In such preferred embodiments, this layer is applied by a process other than thermal spraying and solid-state cladding, which are hardfacing processes which are not welding-based. This second or build-up layer in certain preferred embodiments is applied by a process which forms an arc between a first electrode and the substrate functioning as a second electrode, which results in adequate heat input to the cobalt-based dilution buffer layer to yield good integration between the two cobalt-based layers.

The build-up coating on top of the dilution buffer is preferably a single surface layer deposited by oxyacetylene gas welding (OAW), gas tungsten arc welding (GTAW), tungsten inert gas welding (TIG), gas metal arc welding (GMAW), metal inert gas welding (MIG), submerged arc welding (SAW), or plasma transferred arc welding (PTA). The most currently preferred process is PTA welding, which is well understood in the art. The PTA powder size is preferably between 45 and 150 microns. This build up layer preferably has a thickness of between about 0.05 and about 0.8 inch, such as between about 0.08 and about 0.5 inch. This build-up layer has the surface properties of wear- and corrosion-resistance desired for the ultimate component, so this build-up layer typically forms and defines the ultimate surface of the component, and no metal layers are applied over this layer. By applying this cobalt-based build-up layer over the cobalt-based dilution buffer layer by welding, and by doing so at a temperature above the liquidus of the dilution buffer layer, this integrates the build-up layer and the dilution buffer layer into an integral cobalt-based wear- and corrosion-resistant layer. Thereafter the component is cooled to room temperature. The resulting microstructure of the integral layer is similar to a cast structure which is coarser than the sintered microstructure of the dilution buffer prior to welding. In certain preferred embodiments, such as with Stellite 6, this microstructure is hypo-eutectic.

The composition of the build-up layer is selected to provide wear- and corrosion-resistance as required in nuclear power plant and chemical valve applications. In one embodiment, this second layer comprises between about 25 and about 35 wt % Cr, between about 2 and about 7 wt % W, up to about 1.5 wt % Si, between about 0.5 and 1.5 wt % C, and between about 55 and about 70 wt % Co. Suitable cobalt-based alloys include, for example, Stellite 6. In one preferred embodiment, the build up material is selected to have a composition which is very similar to the composition of the dilution buffer material in that it differs from the dilution buffer concentration by less than 10 wt %, which means that the distinctions between the elemental concentrations between the dilution buffer and overlayer are cumulatively less than 10 wt %. So if the build-up (overlayer) material has a composition of 1.2 wt % C, 28 wt % Cr, 1.1 wt % Si, 4.5 wt % W and balance Co (65.05 wt %), and the dilution buffer has a composition of 1.2 wt % C, 28 wt % Cr, 1.1 wt % Si, 4.5 wt % W, 0.15 wt % B, and balance Co (65.2 wt %), then the compositions differ by less than 10 wt %, in fact by less than 5 wt %, and in fact only 0.3 wt % (0.15 wt % B v. 0 wt % B, +65.2 wt % Co v. 65.05 wt % Co). In an alternative embodiment, the elemental concentrations of the overlayer and the dilution buffer differ by more than 10 wt %.

In prior applications where certain cobalt-based alloys have been hardfaced by PTA or other welding technique directly onto a mild steel substrate, the wear- and/or corrosion-resistance of the valve component has been compromised due to dilution of carbon from the cobalt-based overlay into the fusion zone between the coating and the substrate. This creates an ultra-high carbon concentration in the fusion zone, making the part more vulnerable to corrosive attack there. This is a phenomenon distinct from the issue discussed above regarding the dilution of iron from the substrate into the coating. The dilution buffer employed in this invention provides a remedy to both dilution of carbon from the cobalt-based surface coating into the fusion zone, and dilution of iron from the substrate material into the surface coating.

The product yielded from this invention therefore in one preferred embodiment comprises an iron-based substrate with a cobalt-based wear- and corrosion-resistant layer comprising a band that functions as a dilution buffer directly on the iron-based substrate, and a cobalt-based band directly over the dilution buffer which also defines the wear- and corrosion-resistant surface imparted to the component. At the interface between the dilution buffer band and the substrate, there is essentially no heat-affected zone and no fusion zone, due to the nature of the fusion coating process employed to deposit the dilution buffer layer which is subsequently integrated with the build-up layer to form the integral cobalt-based layer. It is particularly due to the relatively low heat input of the fusion coating process. Any heat-affected zone and/or fusion zone at this interface between the substrate and the dilution buffer layer is therefore kept to a thickness of less than 0.005 inch. There is essentially no interface between the cobalt-based dilution buffer and the cobalt-based surface weld overlayer in the preferred embodiment because they are the same or similar materials and because they are fully integrated by the welding deposition process. The cobalt-based dilution buffer and the cobalt-based build-up overlayer form a unique hardfacing deposit with the iron dilution controlled.

By performing this process, the cobalt-based wear- and corrosion-resistant coating after cooling has an average level of iron dilution from the iron-based substrate into the cobalt-based wear- and corrosion-resistant layer of less than 5 wt % iron, such as between 2 and 5 wt %, for example between 3 and 4 wt %, near the component's service surface, for example at a level spaced 0.06 inch from the substrate surface. What this means is that, for example, if the composition of the precursor material used to create the coating at this location is between 40 and 70 wt % Co, between about 25 and about 35 wt % Cr, between about 2 and about 7 wt % W, up to about 1.5 wt % Si, and between about 0.5 and 1.5 wt % C, then the composition of the coating after cooling—while it differs from the precursor composition because it now contains some iron diluted into the coating from the substrate—contains less than 5 wt % iron, such as between 2 and 5 wt % iron, for example between 3 and 4 wt % iron. This iron concentration may be measured anywhere in the depth of the coating. At a level of 0.06 inch above the substrate surface is selected here and in the working example because this location is squarely within the band of material in the coating which is deposited by welding, since the underlying dilution buffer band is typically between 0.005 and 0.03 inch thick. This level is also selected because it is well beneath the actual surface of the coating which will see wear and corrosion, and therefore the iron dilution at this 0.06 inch level will be even higher than the level of dilution at the wear surface.

In carrying out the present invention, it is preferred to apply the dilution buffer by a fusion coating process which employs a powder slurry to apply the cobalt-based, dilution buffer layer to the iron-based substrate. The fusion process comprises preparing a slurry comprising powdered Co alloy particles suspended in an organic binder and solvent. A typical slurry comprises between about 30 and about 60 vol % of Co-based metallic composition, between about 0.5 and about 5 vol % binder, and between about 40 to about 70 vol % solvent. The substrate surface is cleaned in preparation for the coating process. The slurry is then applied to the component part, yielding a steel substrate shape having a slurry on the surface of the component. The slurry is then allowed to dry. After the component part is dry, the component is heated in a vacuum furnace to sinter the Co alloy particles and drive off the carrier.

The slurry comprises fine Co-based alloy powder, preferably of an alloy comprising more than 40 wt % Co, such as between 40 and 70 wt % Co. In certain preferred embodiments the alloy comprises between about 25 and about 35 wt % Cr, between about 2 and about 7 wt % W, up to about 1.5 wt % Si, between about 0.5 and 1.5 wt % C, and between about 55 and about 70 wt % Co, with between about 0.05 and 0.5% B added. One particular exemplary alloy is Stellite 6 with boron added, which has a nominal composition of 1.2 wt % C, 28 wt % Cr, 1.1 wt % Si, 4.5 wt % W, 0.15 wt % B, and balance Co (65 wt %). The average particle size of the alloy powder is less than 45 microns to precisely control the ultimate grain size to less than 50 microns, which is important to forming a smooth buffer layer. The powder has a generally spherical morphology, and other shapes such as angular, irregular, or spikey shapes are avoided.

The organic binder is a substance such as methyl cellulose that is capable of temporarily binding the Co alloy particles until they are sintered. The solvent is a fluid (e.g., water or alcohol) capable of dissolving the organic binder and in which the alloy particles will remain in suspension. The range of these major components of the slurry is as stated above. In one particular embodiment, there is about 41 vol % of the alloy powder, about 0.75 vol % of the binder, and about 58.25 vol % of the solvent.

The slurry is prepared by mixing the powdered alloy particles, binder, and solvent (e.g., by agitation in a paint mixer). After mixing, the slurry is allowed to rest to remove air bubbles. The time required to remove the air bubbles will vary depending on the number of air bubbles introduced during mixing, which depends to a large extent on the method or apparatus used to mix the slurry. A metal part can be dipped in and removed from the slurry as a simple test of the amount of air bubbles in the slurry. If the slurry adheres to the part in a smooth coat, removal of air bubbles is sufficient.

The substrate to be coated needs to be clean and smooth. The steps taken to clean and smooth the metal body (if any are needed) will vary, depending on the metallurgical processes used to produce the metal body. Generally solvents and the like are used to remove any dirt and grease from the surfaces to be coated. If the surface is not sufficiently smooth, the metal body may need to be polished or otherwise smoothed. The substrate is ready for being coated once the surface is clean and smooth enough that the coating will be smooth when it adheres to the surface.

Application of the slurry to the surface of metal body is preferably achieved by flowing the slurry into the substrate's surface or immersing the substrate into the slurry. The viscosity of the slurry can be adjusted to suit the method of application by controlling the proportion of solvent in the slurry. Once the slurry is applied to the substrate surface, it is allowed to dry (e.g., air dry) until the solvent has substantially evaporated.

After the solvent has evaporated, the component is placed in a furnace to sinter the Co powder particles and drive off the organic binder. The atmosphere in the furnace is preferably a non-oxidizing atmosphere (e.g., inert gas or a vacuum). The sintering temperature is precisely selected so the Co-based coating material on the substrate during sintering exceeds the solidus but never exceeds the liquidus of the coating material. This is critical to minimizing flow while still achieving a secure metallurgical bond between the coating and the body surface. Only between about 30 and about 50 wt % of the coating material melts under these conditions.

For the general class of alloys described herein where the coating material comprises between about 25 and about 35 wt % Cr, between about 2 and about 7 wt % W, up to about 1.5 wt % Si, between about 0.5 and 1.5 wt % C, and between about 55 and about 70 wt % Co, the sintering parameters are a temperature between 2200° F. and 2280° F. for a time between 0.5 hour and 2 hours.

Example 1

Figure 3:
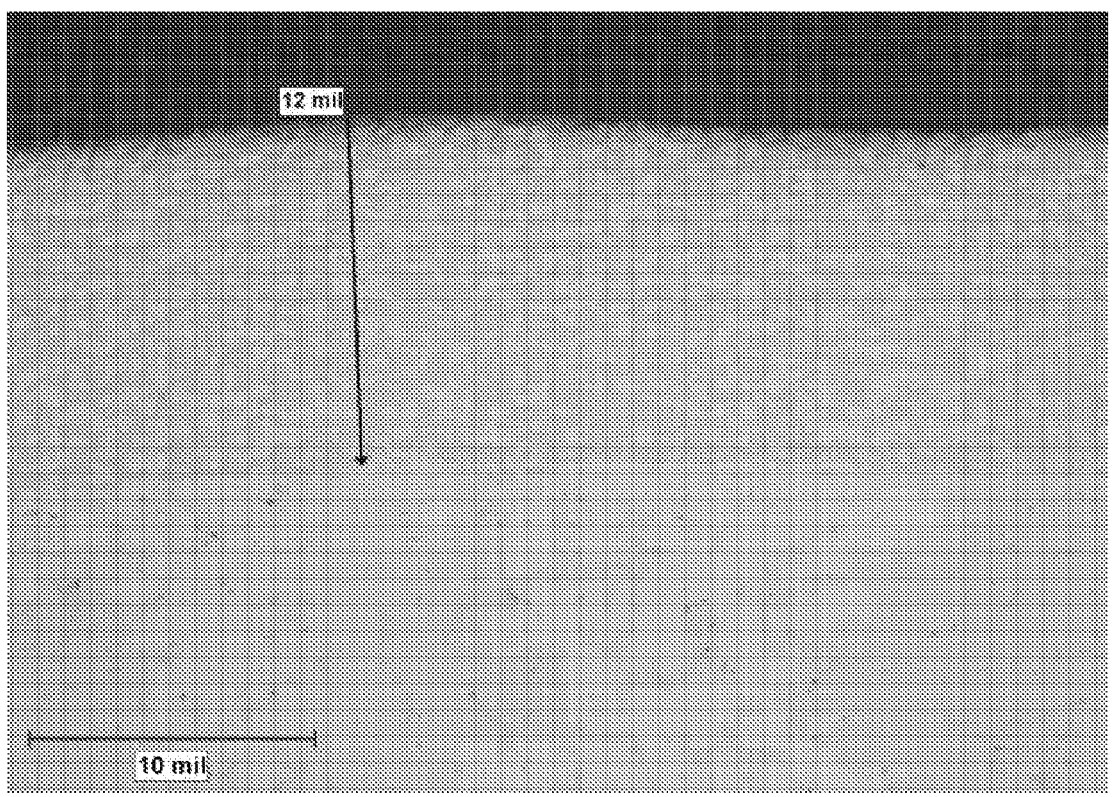
FIG. 3 is a photomicrograph showing a dilution buffer layer of the invention.

A layer of Stellite 6 having a thickness of 0.012 inch was applied by slurry coating and sintering. The nominal composition was 1.2% C, 28% Cr, 1.1% Si, 4.5% W, 0.15% B, and balance Co (65%). The slurry contained 40.5 vol % metal powder, 0.75 vol % binder (methyl cellulose), and 58.75 vol % water as solvent. The metal powder had size of less than 45 microns. Sintering conditions were 2230° F. for 60 minutes in a vacuum atmosphere. The substrate was mild steel. As shown in FIG. 3, there is essentially no heat-affected zone (HAZ). Dilution of Fe up into the sintered coating is essentially zero. This layer shown in FIG. 3 has a thickness of 0.012 inch and has a fine hypo-eutectic microstructure where the majority of carbide is fine and within the eutectic regions.

Example 2

Figure 4:
FIGS. 4 through 7 are photographs of samples prepared in accordance with working examples herein.
Figure 5:
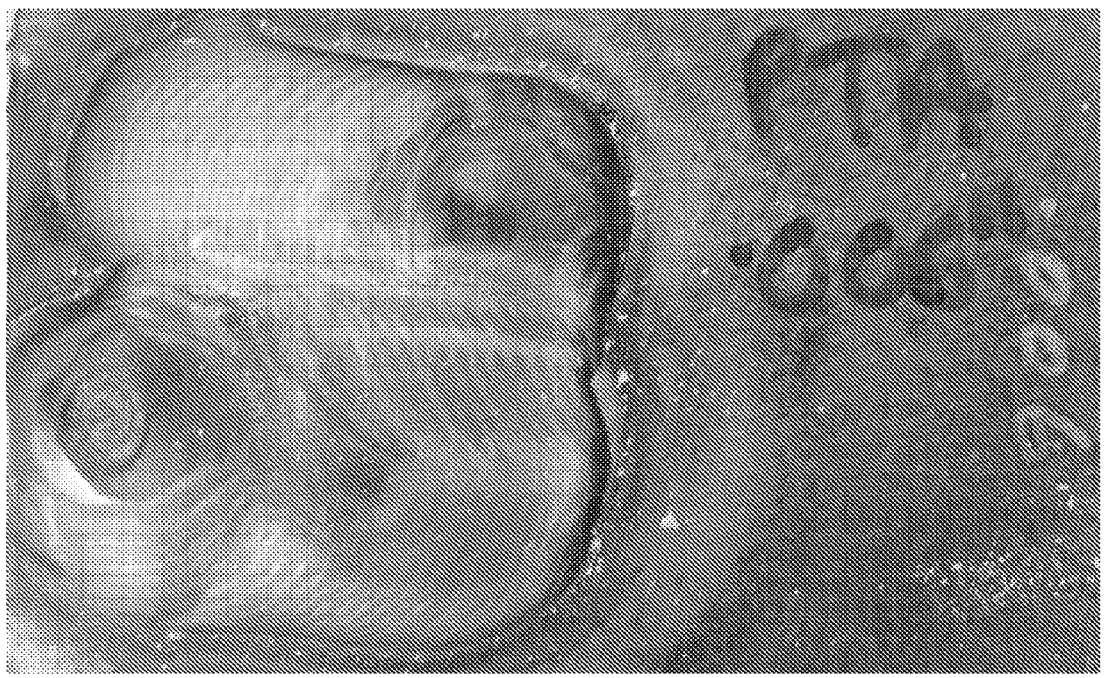
Figure 6:
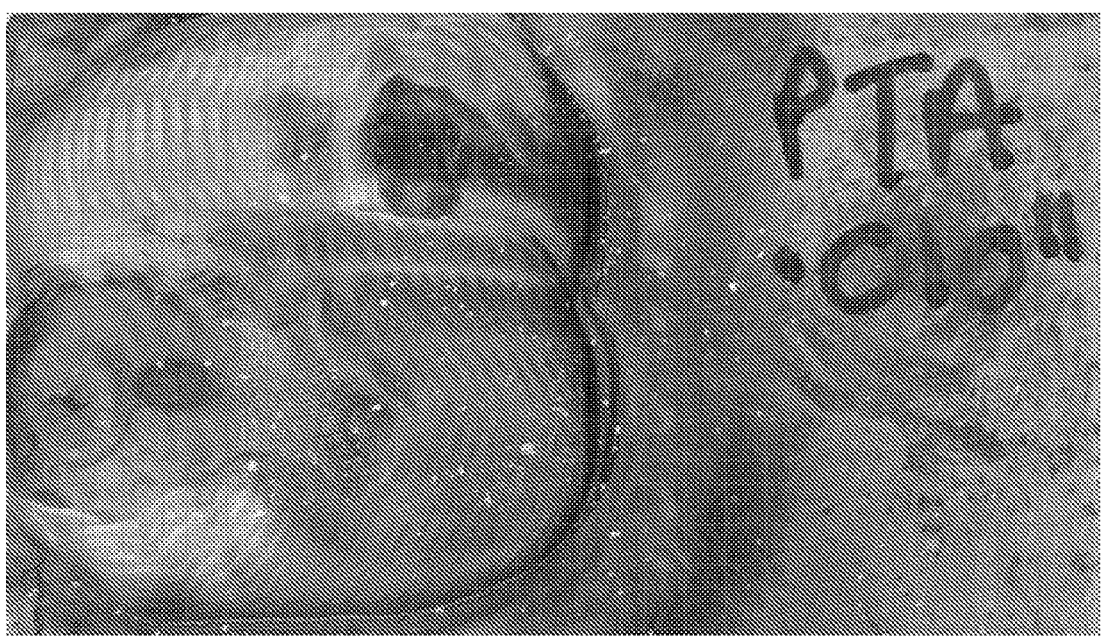

The iron dilution levels within a cobalt-based PTAW layer directly on steel was compared to levels in cobalt-based PTAW layers over fusion-coated dilution buffer layers. The surfaces of three mild steel coupons were rough ground to clean the surfaces prior to hardfacing. To the first coupon was applied a PTAW layer of Stellite 6 to a thickness of 0.155" (3.94 mm) directly on the mild steel coupon (FIG. 4). To the second coupon was applied a fusion-coated dilution buffer layer of Stellite 6 to a thickness of 0.006" (0.15 mm), followed by a PTAW layer of Stellite 6 of about 0.145" (3.68 mm) (FIG. 5). To the third coupon was applied a fusion-coated dilution buffer layer of Stellite 6 to a thickness of 0.010" (0.25 mm), followed by a PTAW layer of Stellite 6 of about 0.145" (3.68 mm) (FIG. 6). The iron dilution in the PTA coating of FIG. 4 directly on the mild steel was about 10%. The iron dilution was only about 4 wt % in the PTA coating on the coupon with the 0.06" (0.15 mm) Stellite 6 buffer layer, and was only about 3 wt % in the PTA coating on the coupon with the 0.010" (0.25 mm) Stellite 6 buffer layer. The use of the thin fusion-coated dilution buffer layer therefore effectively reduced the iron dilution to less than 5%.

Example 3

Figure 7:
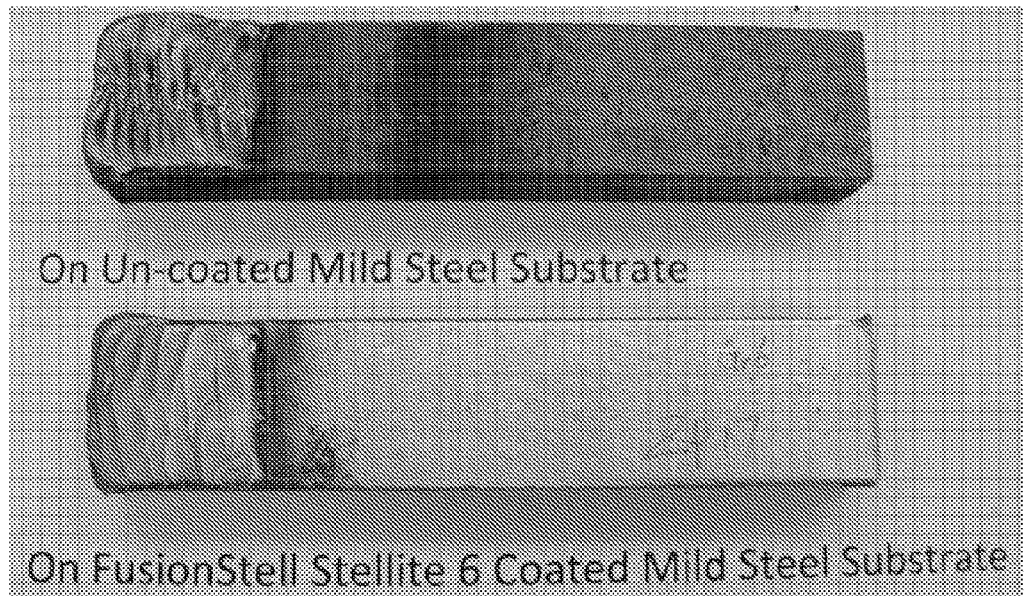
Figure 8:
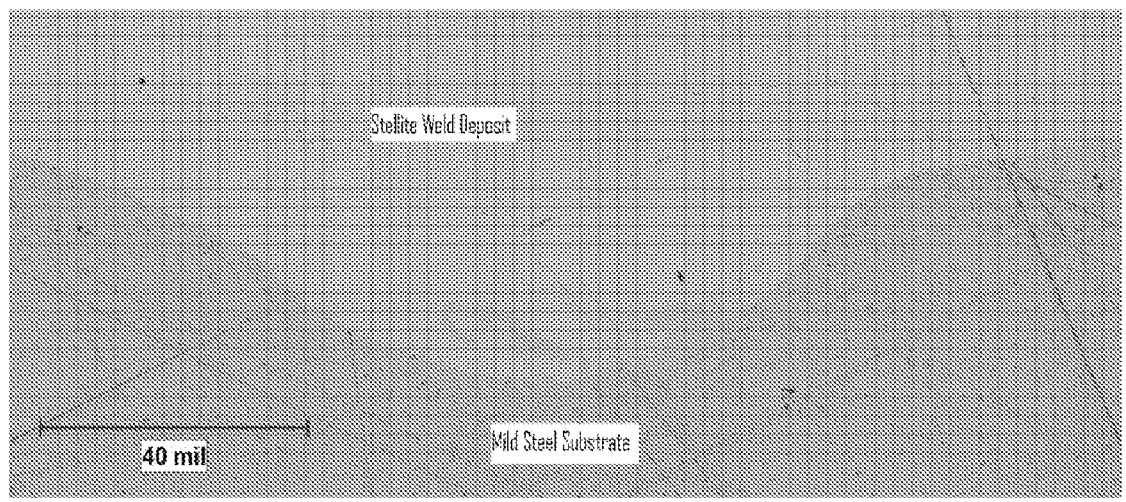
FIGS. 8 and 9 are photomicrographs of samples described in the examples.
Figure 9:
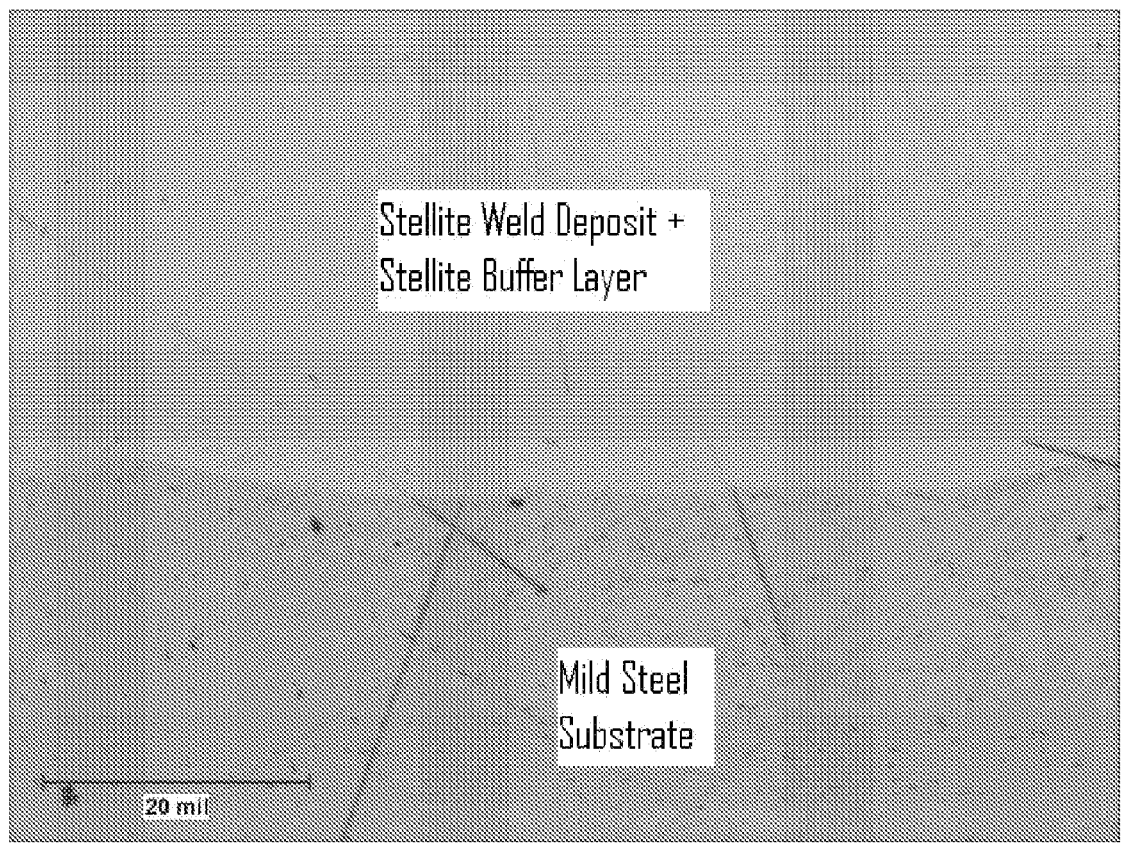

Stellite 6 weld deposits were applied by gas tungsten arc welding (GTAW) using 1/16" diameter Stellite 6 welding wire. A first weld overlay was applied directly on mild steel to a thickness of about 0.120" to 0.125" (3.05 mm to 3.18 mm), and is shown in the upper image in FIG. 7, and in the image in FIG. 8. A second overlay shown in the lower image in FIG. 7 and in FIG. 9 was applied to a thickness of about 0.120" to 0.125" (3.05 mm to 3.18 mm) over a fusion-coated dilution buffer layer of Stellite 6 having a thickness of 0.012" (0.30 mm). The figures illustrate that the cobalt-based Stellite 6 buffer layer resulted in a good profile, good fusion quality, very smooth fusion line, and good surface appearance; whereas the overlay on the bare mild steel had a poor profile, wavy fusion line, and rough surface appearance.

Example 4

The GTAW Stellite 6 weld overlays of Example 3 were ground to leave 0.060 inch of the overlays above the substrate thickness to be tested for Fe dilution within the cobalt-based Stellite 6 layer. The Fe content was measured by Thermo Fisher ARL-3460 Spectrometer at three locations and in the sample directly on the steel coupon without the fusion-coated dilution buffer layer was determined to be 25.49%, 19.67%, and 24.16% Fe by weight. The Fe content in the coating applied over the fusion-coated dilution buffer layer was 3.25%, 3.54%, and 3.40% Fe by weight. The thin cobalt-based, fusion-coated dilution buffer band in the overall cobalt-based wear- and corrosion-resistant layer therefore effectively reduced the Fe dilution in the cobalt-based surface coating after cooling to an average level of iron dilution from the iron-based substrate into the cobalt-based wear- and corrosion-resistant layer of less than 5 wt % iron, such as between 2 and 5 wt %, and in particular to between 3 and 4 wt %, at a level spaced 0.06 inch from the substrate surface.

Example 5

Figure 10:
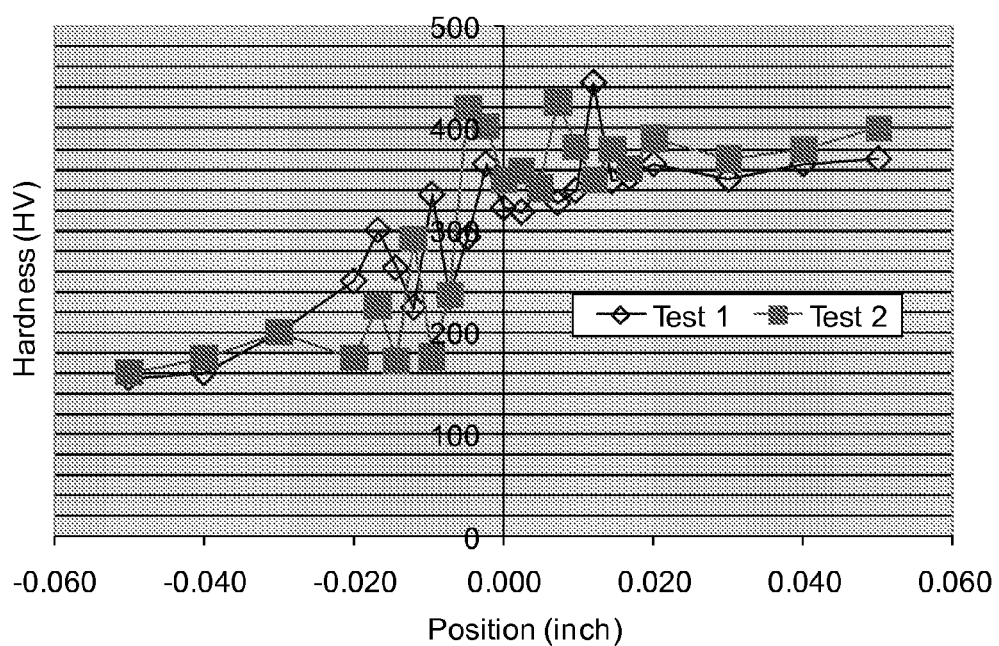
FIGS. 10 and 11 show hardness profiles described in Example 5.
Figure 11:
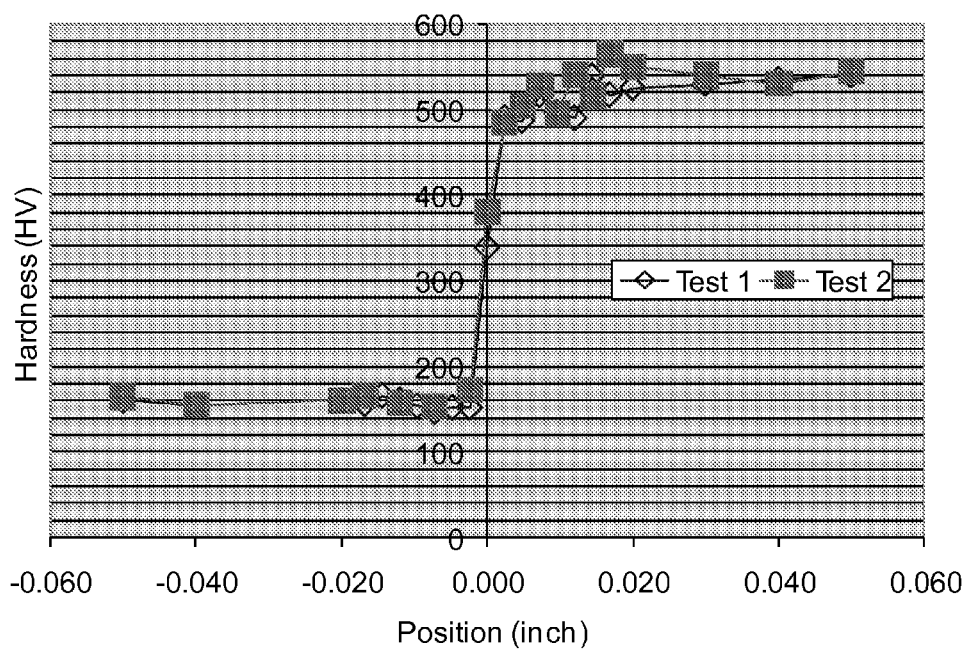

Vickers hardness was examined along depth of the Stellite 6 overlay including the steel substrate, fusion zone and the final Stellite 6 deposit surface layer. The hardness test was conducted under 1 kg load and 15 second dwell time on polished cross section under 400× magnification. In the sample with no cobalt-based, fusion-coated, dilution buffer layer, the fusion zone penetrates deep into the steel substrate (~0.040") and cobalt-based surface coating has a relatively lower hardness of about 350-400 HV. The hardness profile shown in FIG. 10 shows a smooth transition between hardness levels in the Fe-based substrate (from −0.06 to 0.00") and those in the cobalt-based surface coating (from 0.00 to 0.06"). This, as well as the absolute hardness levels between 300 and 400 HV in the surface coating, indicate that the Fe dilution decreased the hardness of the cobalt-based surface layer, and the substrate melted and mixed with cobalt-based surface layer forming a wide fusion zone. This results in a high dilution of iron and a high dilution of carbon in the wide fusion zone. In contrast, FIG. 11 shows that a fusion-coated, dilution buffer layer yielded a surface overlayer having a much higher hardness of about 500-550 HV, indicating that a pure Stellite 6 weld overlay is maintained, substantially undiluted by Fe and C.

The foregoing examples illustrate that a thin cobalt-based, fusion-coated, dilution buffer layer was extremely effective at insulating the base material during the subsequent hardfacing process with cobalt-based alloys and thereby reducing Fe dilution into the critical wear- and corrosion-resistant coating.

Example 6

Figure 12:
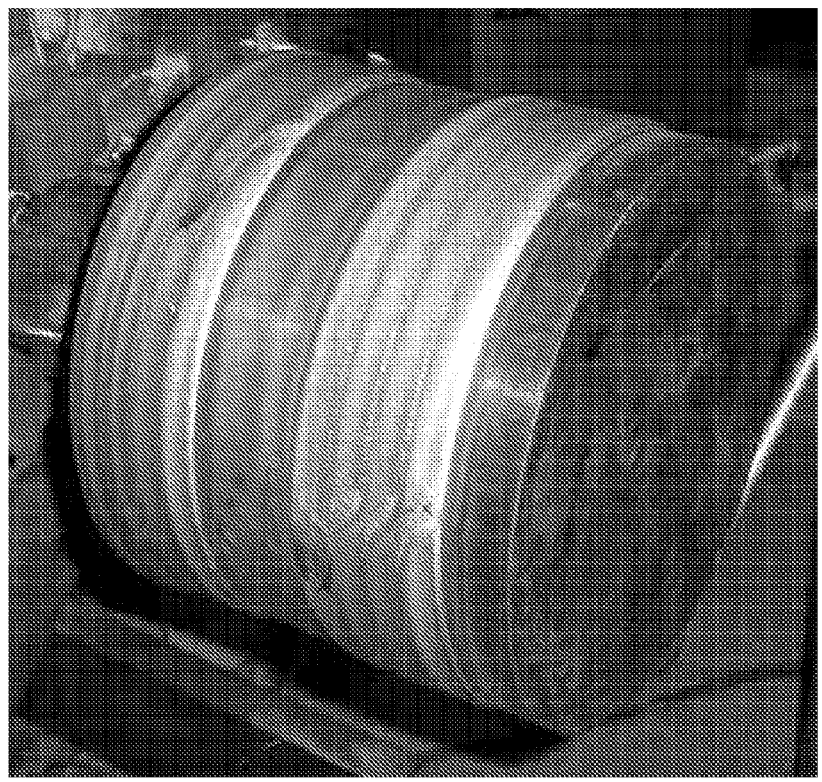
FIGS. 12 through 19 are photographs of valve components.
Figure 13:
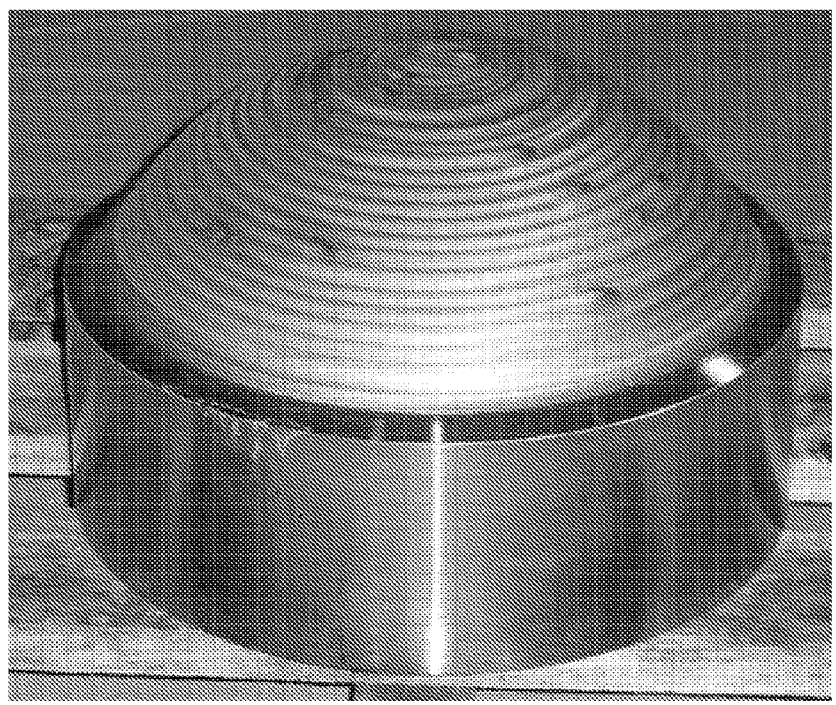
Figure 14:
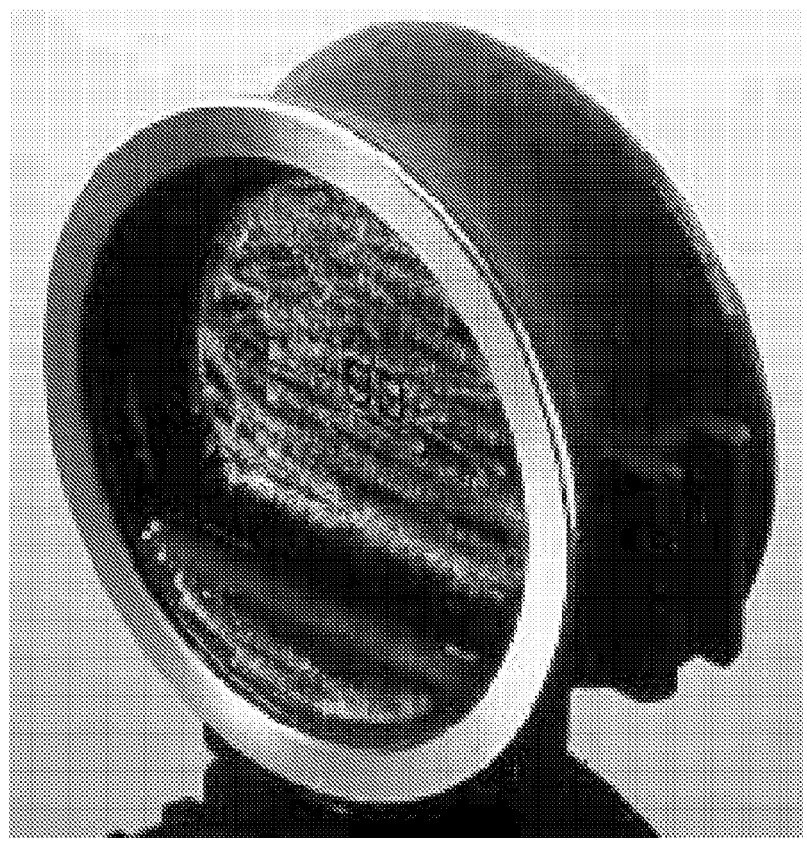
Figure 15:
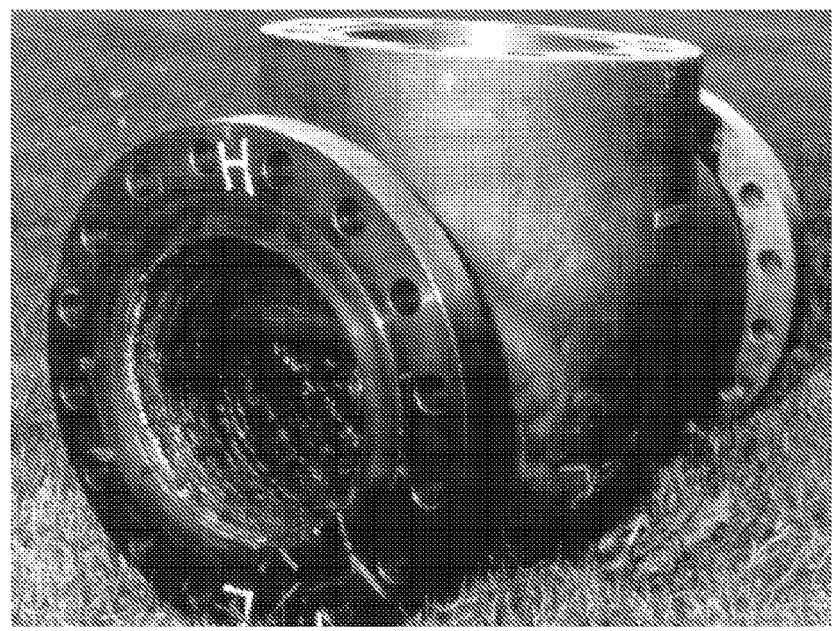
Figure 16:
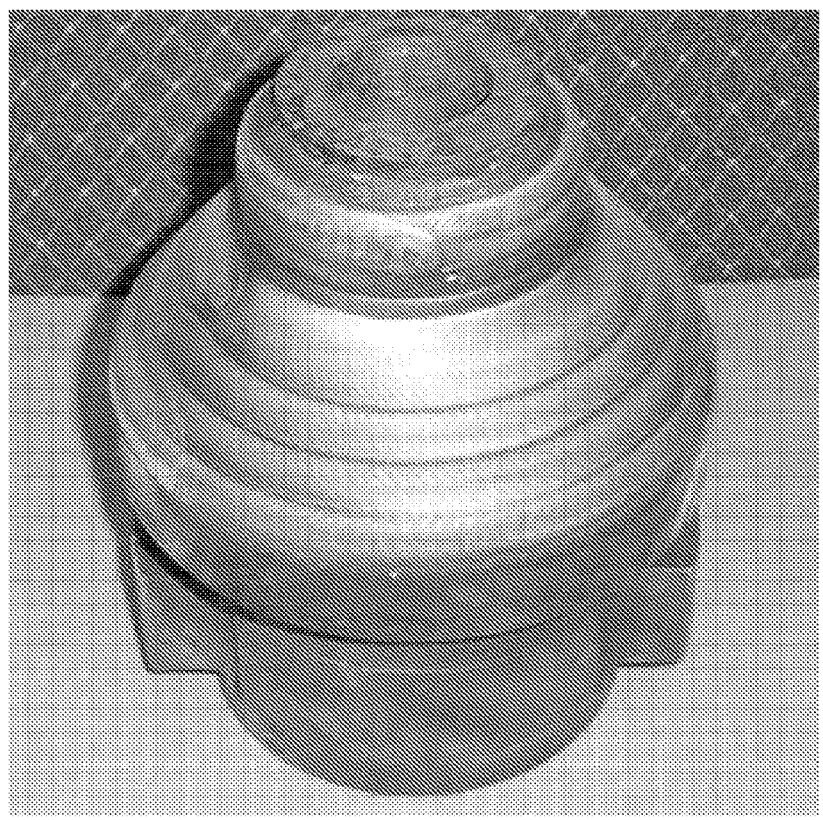
Figure 17:
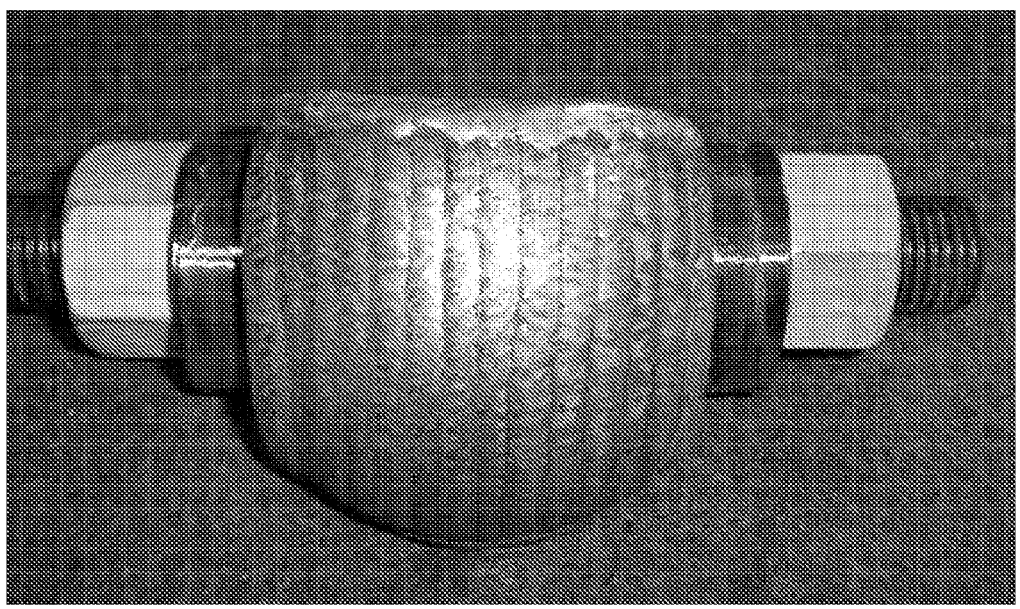
Figure 18:
Figure 19:

FIGS. 12 through 19 illustrate valve components to which the dilution buffer and surface overlay of the present invention may be applied. FIG. 12 shows a 10 inch diameter valve with Stellite 6 cobalt-based alloy applied. FIG. 13 shows a ball-and-ring assembly with a Stellite cobalt-based alloy thereon. FIG. 14—gate valve inner diameter with Stellite cobalt-based alloy overlay. FIG. 15—petrochemical valve with inner diameter overlaid with cobalt-based Stellite 3. FIG. 16—valve with cobalt-based Stellite 6 overlay. FIG. 17—V-ball valve overlaid with cobalt-based Stellite alloy. FIG. 18—wedge valve overlaid with cobalt-based Stellite alloy. FIG. 19—valve seats of the type that may be made from mild steel or nickel alloy and overlaid with a cobalt-based alloy according to this invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

The above description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

The invention claimed is:

1. A method for forming a wear- and corrosion-resistant coating on an industrial component comprising:
   a) applying a cobalt-based dilution buffer layer having a thickness between about 0.005 and about 0.03 inch directly onto an iron-based substrate by slurry coating of a cobalt-based alloy powder followed by sintering to fuse the powder together and to the substrate, wherein the cobalt-based dilution buffer layer is a cobalt-based alloy;
   b) applying by welding a cobalt-based build-up layer over the cobalt-based dilution buffer layer to integrate the build-up layer and the dilution buffer layer into an integral cobalt-based wear- and corrosion-resistant layer, wherein the cobalt-based build-up layer is a cobalt-based alloy and is an outer surface layer; and
   c) cooling the component to room temperature.

2. The method of claim 1 wherein the cobalt-based wear- and corrosion-resistant layer after said cooling has an average level of iron dilution from the iron-based substrate into the cobalt-based wear- and corrosion-resistant layer of less than 5 wt % iron at a level spaced 0.06 inch from the substrate surface.

3. The method of claim 1 wherein the sintering is carried out at a temperature above a solidus temperature but below a liquidus temperature of the cobalt-based alloy being sintered and the temperature of the substrate during sintering is maintained below a solidus temperature of the substrate.

4. The method of claim 1 wherein any heat-affected zone and/or fusion zone at an interface between the substrate and the dilution buffer layer has a thickness of less than 0.005 inch.

5. The method of claim 1 wherein the cobalt-based build-up layer is applied by welding directly over the cobalt-based dilution buffer layer.

6. The method of claim 5 wherein the sintering is carried out at a temperature above a solidus temperature but below a liquidus temperature of the cobalt-based alloy being sintered and the temperature of the substrate during sintering is maintained below a solidus temperature of the substrate.

7. The method of claim 5 wherein any heat-affected zone and/or fusion zone at an interface between the substrate and the dilution buffer layer has a thickness of less than 0.005 inch.

8. A method for forming a wear- and corrosion-resistant coating on an industrial valve component comprising:
   a) applying a cobalt-based dilution buffer layer having a thickness between about 0.005 and about 0.03 inch directly onto to an iron-based valve component body substrate selected from the group consisting of a valve body, a ball of a ball-and-ring valve assembly, a seat of a ball-and-ring valve assembly, a gate valve component body, a V-ball valve component body, a wedge valve component body, wedge valve guides, and a valve seat body, said applying comprising slurry coating of a cobalt-based alloy powder followed by sintering to fuse the powder together and to the substrate, wherein the cobalt-based dilution buffer layer is a cobalt-based alloy;
   b) applying by welding a cobalt-based build-up layer over the cobalt-based dilution buffer layer to integrate the build-up layer and the dilution buffer layer into an integral cobalt-based wear- and corrosion-resistant layer, wherein the cobalt-based build-up layer is a cobalt-based alloy and is an outer surface layer; and
   c) cooling the component to room temperature.

9. The method of claim 8 wherein the cobalt-based wear- and corrosion-resistant layer after said cooling has an average level of iron dilution from the iron-based substrate into the cobalt-based wear- and corrosion-resistant layer of less than 5 wt % iron at a level spaced 0.06 inch from the substrate surface.

10. The method of claim 9 wherein the build-up layer has a thickness between about 0.05 and about 0.8 inch.

11. The method of claim 8 wherein the build-up layer has a thickness between about 0.05 and about 0.8 inch.

12. The method of claim 11 wherein the cobalt-based wear- and corrosion-resistant layer after said cooling has an average level of iron dilution from the iron-based substrate into the cobalt-based wear- and corrosion-resistant layer of between 2 and 5 wt % iron at a level spaced 0.06 inch from the substrate surface.

13. The method of claim 11 wherein the cobalt-based wear- and corrosion-resistant layer after said cooling has an average level of iron dilution from the iron-based substrate into the cobalt-based wear- and corrosion-resistant layer of between 3 and 4 wt % iron at a level spaced 0.06 inch from the substrate surface.

14. The method of claim 8 wherein the welding partially melts the dilution buffer layer.

15. The method of claim 8 wherein the welding is by a welding technique which includes establishment of an arc between an electrode and the substrate as a counter-electrode.

16. The method of claim 8 wherein the welding is plasma transferred arc welding.

17. The method of claim 8 wherein the cobalt-based powder comprises between 40 and 70 wt % Co, between 25 and 35 wt % Cr, between 2 and 7 wt % W, up to about 1.5 wt % Si, and between 0.5 and 1.5 wt % C.

18. The method of claim 17 wherein the cobalt-based powder further comprises between 0.05 and 0.5% B.

19. The method of claim 17 wherein the build-up layer comprises between 40 and 70 wt % Co, between 25 and 35 wt % Cr, between 2 and 7 wt % W, up to about 1.5 wt % Si, and between 0.5 and 1.5 wt % C.

20. The method of claim 8 wherein the build-up layer comprises between 40 and 70 wt % Co, between 25 and 35 wt % Cr, between 2 and 7 wt % W, up to about 1.5 wt % Si, and between 0.5 and 1.5 wt % C.

21. The method of claim 8 wherein the cobalt-based build-up layer is applied by welding directly over the cobalt-based dilution buffer layer.

22. The method of claim 21 wherein the sintering is carried out at a temperature above a solidus temperature but below a liquidus temperature of the cobalt-based alloy being sintered and the temperature of the substrate during sintering is maintained below a solidus temperature of the substrate.

23. The method of claim 21 wherein any heat-affected zone and/or fusion zone at an interface between the substrate and the dilution buffer layer has a thickness of less than 0.005 inch.

24. The method of claim 8 wherein the sintering is carried out at a temperature above a solidus temperature but below a liquidus temperature of the cobalt-based alloy being sintered and the temperature of the substrate during sintering is maintained below a solidus temperature of the substrate.

25. The method of claim 8 wherein any heat-affected zone and/or fusion zone at an interface between the substrate and the dilution buffer layer has a thickness of less than 0.005 inch.

* * * * *